United States Patent [19]

Johnson

[11] Patent Number: 4,597,360
[45] Date of Patent: Jul. 1, 1986

[54] SALINITY DRIVEN OCEANOGRAPHIC UPWELLING

[75] Inventor: David H. Johnson, Lakewood, Colo.

[73] Assignee: The United States of America as represented by the United States Department of Energy, Washington, D.C.

[21] Appl. No.: 645,650

[22] Filed: Aug. 30, 1984

[51] Int. Cl.[4] ............................................. A01K 61/00
[52] U.S. Cl. ........................................................ 119/3
[58] Field of Search ....................... 119/2, 3, 4; 210/170

[56] References Cited

U.S. PATENT DOCUMENTS

| | | | |
|---|---|---|---|
| 3,928,145 | 12/1975 | Othmer | 119/3 X |
| 4,044,720 | 8/1977 | Fast | 119/3 |
| 4,051,810 | 10/1977 | Breit | 119/3 |
| 4,189,379 | 2/1980 | Finley | 119/3 X |

Primary Examiner—Robert P. Swiatek
Attorney, Agent, or Firm—Kenneth L. Richardson; John M. Albrecht; Judson R. Hightower

[57] ABSTRACT

The salinity driven oceanographic upwelling is maintained in a mariculture device that includes a long main duct in the general shape of a cylinder having perforated cover plates at each end. The mariculture device is suspended vertically in the ocean such that one end of the main duct is in surface water and the other end in relatively deep water that is cold, nutrient rich and relatively fresh in comparison to the surface water which is relatively warm, relatively nutrient deficient and relatively saline. A plurality of elongated flow segregating tubes are disposed in the main duct and extend from the upper cover plate beyond the lower cover plate into a lower manifold plate. The lower manifold plate is spaced from the lower cover plate to define a deep water fluid flow path to the interior space of the main duct. Spacer tubes extend from the upper cover plate and communicate with the interior space of the main duct. The spacer tubes are received in an upper manifold plate spaced from the upper cover plate to define a surface water fluid flow path into the flow segregating tubes. A surface water-deep water counterflow is thus established with deep water flowing upwardly through the main duct interior for discharge beyond the upper manifold plate while surface water flows downwardly through the flow segregating tubes for discharge below the lower manifold plate. During such counterflow heat is transferred from the downflowing warm water to the upflowing cold water. The flow is maintained by the difference in density between the deep water and the surface water due to their differences in salinity. The upwelling of nutrient rich deep water is used for marifarming by fertilizing the nutrient deficient surface water.

23 Claims, 1 Drawing Figure

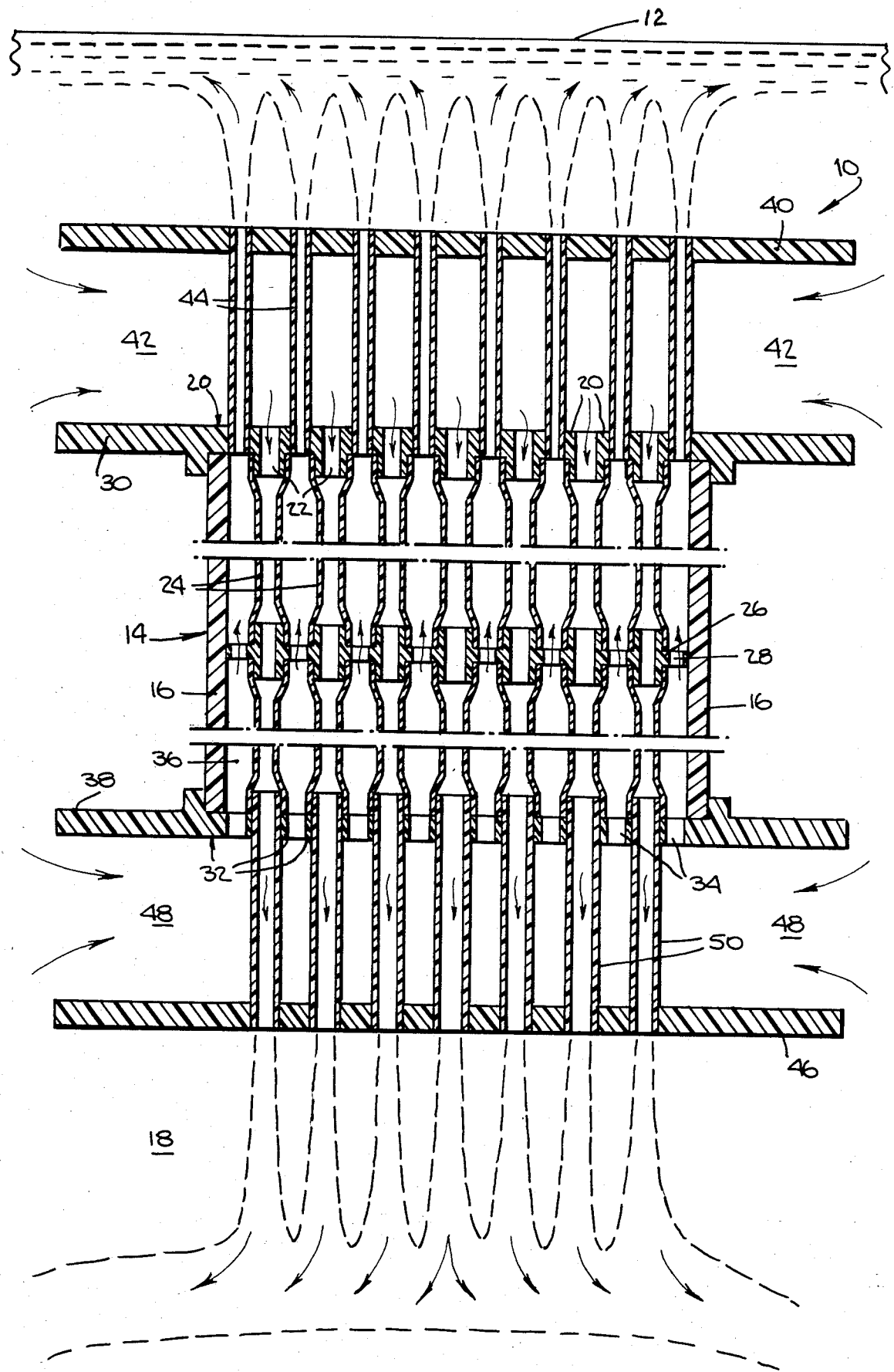

SALINITY DRIVEN OCEANOGRAPHIC UPWELLING

CONTRACTUAL ORIGIN OF THE INVENTION

The U.S. Government has rights in this invention under Contract No. DE-AC02-83CH10093 between the U.S. Department of Energy and the Solar Energy Research Institute, a Division of Midwest Research Institute.

BACKGROUND OF THE INVENTION

1. Field of the Invention

The present invention relates to apparatus and methods for mariculture and more particularly to a salinity driven oceanographic upwelling.

2. Description of the Prior Art

Marine farming of mariculture products such as fish requires the presence of an adequate fertilizer. Ideally, the fertilizer should be available at the water surface to foster the development and growth of mariculture at the water surface and thereby facilitate the harvesting or retrieval of the mariculture.

A desirable fertilizer for fish mariculture includes inorganic materials such as phosphorus. Unfortunately phosphorus material is not present in surface water of the ocean, for example, in sufficient enough quantities to produce commercially viable maricultures. Therefore, in order to develop a mariculture farm in the ocean it is necessary to add the requisite amounts of fertilizer to the water surface at a desired location.

One known approach for providing fertilizer for a mariculture is to dump material containing the fertilizer into the water at a prescribed location suitably surrounded by a known barrier or border structure. However the collection, transportation and dispensation of fertilizer-laden material are usually too expensive to make mariculture farms commercially feasible.

In numerous oceanic locations around the world the water at depths greater than 100 meters is relatively fresh, colder and substantially nutrient rich in comparison with the surface water, which is warmer, has greater salinity and is nutrient deficient. The deep water is also denser than the surface water due to the difference in salinity at such water levels.

However, previous attempts to pump the nutrient-rich deep water to the surface have proven impractical because of the fuel costs for the pumping operation. Furthermore, the efficiency of such a pumping operation is also relatively low since the deep water, because of its high density, has a tendency to sink as soon as it is pumped to the ocean surface.

Another known method of bringing nutrient-rich deep water to the surface, is described in the article "An Oceanographical Curiosity; The Perpetual Salt Fountain" by H. Stommel, A. B. Arons and D. Blanchard, published in *Deep Sea Research*, Vol. 3 (1955), pages 152–155. The method includes placement of a long, vertical pipe into the ocean in such a manner that the bottom of the pipe is exposed to cold, relatively fresh water, while the top of the pipe is in warm saline water. A continuous flow of deep water up the pipe is expected to result after the fountain is primed supposedly due to an exchange of heat, but not salinity, with the ambient ocean. A further investigation of this salt fountain is made in the article "The Salt-Fountain and Thermohaline Convection" by M. E. Stern, published in *Tellus*, Vol. 12 (1960), pages 172–175.

The flow rates for a single pipe exchanging heat with the ambient ocean are estimated for pipes of various diameters in the article "Flow Estimates for the Perpetual Salt Fountains" by G. W. Groves, published in *Deep Sea Research*, Vol. 5 (1959), pages 209–214. According to this article, a pipe 600 meters long and having a 20 centimeter diameter, when installed at an angle that locates the bottom of the pipe 300 meters below the surface, might produce a flow rate of 5.5 liters per second. Presumably this upwelling would supply phosphorus to produce 54 kilograms per year of edible fish.

The same amount of phosphorus could be added to the water by using 290 kilograms per year of Peruvian guano, which has a phosphorus content of 4.6%. Thus the article by Groves concludes that the artificial upwelling is not feasible.

However, applicant has recognized the problem that the size of an artificial upwelling may determine the practicality of marine farming using an upwelling. It is proposed that a commercially viable mariculture should be conducted on a large scale, that is, much greater than 10 acres. There are also other products of a mariculture besides fish which may be commercially viable. These products would require other fertilizers besides phosphorus, such as nitrogen, which do not have cheap alternative sources. For example, kelp for use as a feedstock to produce synthetic natural gas has been proposed as a mariculture product and is fertilized with nitrogen.

Nitrogen is not present in sufficient quantities in surface water to provide a commercially viable kelp yield. A recent article entitled "Systems Analysis Studies on Marine Biomass Commercial Application" by Sullivan, McGinn, Jain and Engel, published by the General Electric Corporation, concluded that commercial nitrogen fertilizer would be too expensive for marifarming even if the only cost consideration was the energy requirements necessary to produce the nitrogen fertilizer.

Deep ocean water is typically rich in nitrogen. Thus the commercial viability of a kelp farm would depend on the development of an economical method for bringing deep water to the ocean surface.

SUMMARY OF THE INVENTION

Against the foregoing background it is therefore a general object of the invention to provide a novel upwelling in the ocean which does not run on fuel shipped to the site and furnishes fertilizer in a practical, cost-effective manner to render marifarming a commercially viable venture.

It is another general object of the invention to provide a novel low-cost method of marifarming.

It is a more specific object of the invention to provide a novel oceanographic upwelling.

It is still another specific object of the invention to provide a novel oceanographic upwelling wherein flow is maintained by the difference in density between deep water and surface water due to the difference in salinity at such water levels.

It is a further specific object of the invention to provide a novel method of marifarming by causing a counterflow between relatively deep water and surface water to form an upwelling.

It is a still further specific object of the invention to provide novel efficient arrangement for transferring the heat from surface water to deep water as the deep water flows counter to the surface water during the formation of an artificial upwelling.

Additional objects, advantages and novel features of the invention shall be set forth in part in the description that follows, and in part will become apparent to those skilled in the art upon examination of the following, or may be learned by the practice of the invention. The objects and the advantages of the invention may be realized and attained by means of the instrumentalities and combinations particularly pointed out in the appended claims.

To achieve the foregoing and other objects, and in accordance with the purpose of the present invention, as embodied and broadly described herein, the upwelling device of this invention includes a main duct having an elongated longitudinal wall portion, opposite end portions and a perforated cover plate at each opposite end portion defining an interior space of the main duct. The perforations in one of the cover plates provide access to the interior space.

A plurality of elongated flow segregating members are supported in the interior space of the main duct and each have one end that extends longitudinally beyond the other perforated cover plate. A manifold plate for each end of the main duct is spaced a predetermined amount from each end portion of the main duct. One of the manifold plates accommodates the extended respective opposite ends of the flow segregating members. The other manifold plate accommodates tubes that communicate with the interior space of the main duct.

The predetermined space between each of the manifold plates and the respective cover plates of the main duct define respective fluid flow paths. One of the fluid flow paths communicates with the interior space of the main duct and the other fluid flow path communicates with the flow segregating members. Under this arrangement, fluid flow through the flow segregating members is isolated from the fluid flow through the interior space of the main duct.

When the mariculture device is installed in the ocean with one end slightly below the surface and the opposite end extending into relatively deep water approximately 300 to 600 meters below the surface, a pump is used to prime downward flow of surface water along one flow path which causes upward flow of deep water along another flow path. Both flow paths are governed by the mariculture device.

After the mariculture device has been adequately primed to establish the desired fluid flow, the pump is removed and a continuous counter flow between surface water and deep water is maintained by virtue of the difference in density between the deep water and the surface water. Such difference in density is due to the difference in salinity between the surface water and the deep water.

Accordingly, the deep water from a predetermined depth is drawn into the mariculture device and flows at a first predetermined flow rate upwardly toward the water surface for dispersal at a first vicinity of the water surface. Water from a second vicinity of the water surface is caused to flow at a second predetermined flow rate downward through the mariculture device toward the deep water depth. The downwardly flowing surface water is dispersed at a vicinity of the deep water that is separate from the incoming deep water. Under this arrangement there is no interference between deep water being drawn upwardly into the mariculture device and downwardly flowing surface water that is discharged into the deep water.

In addition, one of the water flow paths is merged into the flowing water of the other path so that there is intimate contact between one flow path structure and the water of the other flow path. Such intimate contact facilitates the transfer of heat from downwardly flowing surface water to upwardly flowing deep water. The deep water can thus be heated to approximately the temperature of the surface water when the deep water is discharged at the surface. The density level of the upwardly flowing deep water, when it reaches the surface, is thus reduced and floats along with the surface water. The downwardly flowing surface water cools during such flow and increases in density so that it slowly sinks when discharged at a predetermined depth.

Thus the nutrient-rich deep water when brought to the surface fertilizes the surface water and is exchanged with nutrient-deficient surface water.

BRIEF DESCRIPTION OF THE DRAWING

The accompanying drawing of a mariculture device for maintaining an artificial upwelling, which is incorporated in and forms a part of the specification, illustrates a preferred embodiment of the present invention, and together with the description, serves to explain the principles of the invention.

DETAILED DESCRIPTION OF THE PREFERRED EMBODIMENTS

A mariculture device incorporating a preferred embodiment of the invention is generally indicated by the reference number 10 in FIG. 1.

The mariculture device 10 is ballasted in any suitable known manner to float submerged, but close to the water surface, as indicated at 12. The device 10 includes a main duct 14 having an elongated wall portion 16 extending in a longitudinal direction downwardly toward a predetermined depth of deep water as indicated at 18. Preferably the main duct is formed of a fiber reinforced plastic pipe or other suitable protective material such as concrete.

Various structural features of the main duct 14 are similar to an ocean thermal energy conversion (OTEC) cold water pipe as described in the articles "Baseline Designs For Three OTEC Cold Water Pipes" by Griffin and Mortaloni, published in *Proceedings of the* 7th Ocean Energy Conference, June 1980; "OTEC Cold Water Pipe Preliminary Design Report", published by TRW, Inc.; and "OTEC Cold Water Pipe Baseline Designs", by Hove and Grote, published in the *Proceedings of the* 7th Ocean Energy Conference, June 1980.

A cover plate 20 is provided at the surface 12 end of the main duct 14 and includes perforations 22 which provide access to flow segregating members 24 in the main duct 14. The flow segregating members 24 are preferably formed of flexible, thin-walled, polyethylene tubes supported at predetermined intervals in the main duct 14 by support plates 26 having perforations 28. The cover plate 20 also includes a peripheral annular flange 30 extending radially beyond the wall portion 16 of the main duct 14.

A cover plate 32 is provided at the opposite deep water 18 end of the main duct 14 and includes perforations 34 which provide access to an interior space 36 of the main duct 14. A peripheral annular flange 38 extends radially beyond the wall portion 16 of the main duct 14 at the cover plate 32.

An upper manifold plate 40, substantially coextensive with the cover plate 20 is spaced a predetermined distance from the cover plate 20 by rigid tubes 44 that extend through the upper manifold plate 40 and the cover plate 20. The tubes 44 communicate with the interior space 36 of the main duct 14. The space between the cover plate 20 and the upper manifold plate 40 defines a fluid flow path 42 that communicates with the flow segregating members 24 through the cover plate perforations 22.

A lower manifold plate 46, substantially coextensive with the cover plate 32, is spaced a predetermined distance from the cover plate 32 by rigid tubes 50 that extend through the lower manifold plate 46 and the cover plate 32. The tubes 50 communicate with the flow segregating members 24, and form extensions of the flow segregating members 24. The space between the cover plate 32 and the manifold plate 46 defines a fluid flow path 48, that communicates with the interior space 36 of the main duct 14 through the cover plate perforations 34.

The dimensions of the mariculture device 10 can vary depending upon local conditions at the particular location where the device 10 will be used. Such conditions, for example, are the desired temperature differences between the surface water and the deep water level, and the distance between the surface water and the deep water level which will provide the desired temperature difference. Safety conditions will also influence the determination of dimensions of the device 10.

Nevertheless, to exemplify the magnitudes being dealt with, the overall height of the device 10 can be approximately 100 meters to 600 meters. The main duct 14 can have a diameter in the range of 5 to 10 meters, and the flow segregating members can be approximately 10 centimeters in diameter with the wall thickness being in the range of a few tenths of a millimeter.

The exact dimensions of the diameter of the main duct 14 and the spacing between the manifold plates 40, 46 and the cover plates 20, 32 depends on the volumetric flow desired and also on the local conditions. The local conditions will also influence the determination of the exact depth to which the mariculture device 10 is ballasted.

Preferably, the diameter of the upper manifold plate 40 and the cover plate 20 as well as the spacing therebetween is based on a low enough Froude number that permits shallow water to be drawn into the flow segregating members 24 from a water layer at the depth of the fluid flow path 42. Similarly the diameter of the lower manifold plate 46 and the cover plate 32, as well as the spacing therebetween is based on a low enough Froude number that permits the deep water to be drawn into the interior space 36 through the perforations 34 from a water layer at the depth of the fluid flow path 48.

It should be noted that the cross-sectional shape of the main duct 14 can be other than circular, if desired.

In using the mariculture device 10, a suitable known ballasting arrangement (not shown) will float the device 10 in a vertical position such as shown in FIG. 1. In order to start the upwelling of deep cold water through the device 10, it is necessary to employ a mechanical pump to prime the device 10. Accordingly a pump (not shown) is arranged to force surface water through the perforations 22 in the cover plate 30 for downward flow through the flow segregating members 24 and into the rigid tubes 50 which form extensions of the flow segregating members 24. The surface water is then dispersed below the lower manifold plate 46 into the deep water.

As the surface water is pumped downwardly into the deep water, heat is transferred from the flow segregating members 24 to the water that is located outside of the flow segregating members 24 but in the interior space 36 of the main duct 14. Thus the water in the interior space 36 of the main duct 14 begins to rise toward the surface 12 due to the reception of heat from the downwardly flowing surface water. Once this rising action of the deep water occurs, the mariculture device 10 is primed, and the mechanical pump is no longer needed.

The upward flow of cold water and the downward flow of surface water is maintained by the difference in density between the deep water and the surface water due to their differences in salinity. The mariculture device 10 is thus a salinity driven oceanographic upwelling.

The cold, nutrient rich, but relatively fresh deep water flows along the fluid flow path 48, through the perforations 34 in the cover plate 32, and into the interior space 36 of the main duct 14. This flow is continued through the rigid tubes 44 until the deep water is dispersed above the upper manifold plate 40 into the surface water 12.

A counterflow of warm but relatively saline water from the surface moves along the fluid flow path 42, through the perforations 22 of the cover plate 20, into the fluid segregating members 24 and the rigid tubes 50 which form extensions of the fluid separating members 24. The surface water flow, which is counter to the flow of deep water, is dispersed below the lower manifold plate 46 into the deep water.

The function of the upper manifold plate 40 is to direct the warmed deep water to the surface where it can be used to fertilize a mariculture, as well as to prevent recirculation of the warmed deep water into the fluid flow path 42. Such recirculation could cause the upwelling through the flow segregating members 24 to cease.

The downward flow of surface water and the upward flow of deep water result in an exchange of heat across the thin walls of the flow segregating members 24, maintaining a constant temperature difference between the water in the interior space 36 and the water in the flow segregating members 24 along the length of the main duct 14.

The elongated wall portion 16 of the main duct 14, in addition to confining the upward flow of deep water, also protects the flow segregating members 24 located inside the main duct 14.

The surface water which flows downwardly toward the deep water is preferably cooled to within a few degrees centigrade of the temperature of the deep water by the time it is discharged. Since the cooled surface water that is discharged below the lower manifold plate 46 is saltier than the deep water normally present, the discharged surface water is denser than the deep water at the lower manifold depth. Consequently the discharged surface water immediately sinks to a level at which the surrounding water has the same density. Furthermore, the discharged surface water continues to slowly sink as it transfers heat to the surrounding colder water.

The purpose of the lower manifold plate 46 is to direct the cooled surface water toward the ocean depths so that recirculation of this water into the fluid flow path 48 cannot occur; such recirculation can cause the upwelling to cease. Recirculation is also inherently prevented by the operating principles of the invention which cause the rising discharged deep water to rise and float on the surface and the downflowing discharged surface water to fall to its own density level deeper than the lower manifold plate 46. Thus the novel structure of the mariculture device 10 ensures that a separation is maintained between the water that flows along the fluid flow paths 42 and 48 and the water that is discharged beyond the upper manifold plate 40 and the lower manifold plate 46.

The nutrient rich, brackish, cold deep water, which flows horizontally along the fluid flow path 48, is kept separate from the discharged surface water by virtue of the natural stratification which exists in the ocean at such depths.

When the warmed up deep water is discharged above the upper manifold plate 40, it has been warmed to a temperature that is slightly less than the normal temperature of the surface water. However the warmed up deep water, because of its lower salinity, is more buoyant than the ambient surface water. Thus the warmed up deep water, due to its buoyancy, continues to rise toward the water surface.

The stream of water entering the mariculture device along the fluid flow path 42 is kept separate from the water which exits above the upper manifold plate due to the stratification that is established by the density differences between the entering surface water and discharged deep water.

Thus, once a flow has been established through the mariculture device, it is maintained by the buoyancy differences between the warmed up deep water that flows upwardly and the cooled surface water that flows downwardly due to the salinity differences between the deep water and the surface water.

The manufacture of a mariculture device 10 can proceed once the local prevailing conditions at the site of the marifarm are determined. Thus the salinity and temperature at the water surface and at a predetermined depth from the water surface are measured. With this information it can be established that flow segregating tubes having a diameter D surrounded by a main duct 14 will extend vertically downward from the surface of the ocean to a depth L. Deep water rises through the interior space 36 of the main duct 14 and exchanges heat with a counterflow of surface water flowing down the tubes 24.

Let $S_o$, $T_o$ denote the salinity and temperature of the surface water, respectively, and $S_1$, $T_1$ the salinity and temperature of the water at the depth L, respectively, with $T_o > T_1$ and $S_o > S_1$. If the compressibility of water due to pressure is ignored, the difference in density $\rho$ of seawater inside the flow segregating tubes 24 and outside the tubes 24 but within the interior space 36 can be approximated by $$\Delta \rho = \rho(\beta \Delta S - \alpha \Delta T), \quad (0)$$

where $$\Delta S = S_o - S_1,$$

$$\alpha = -\frac{1}{\rho} \frac{d\rho}{dT} \text{ and } \beta = \frac{1}{\rho} \frac{d\rho}{dS}.$$

The pressure head to the density difference between the rising water in the flow segregating tubes 24 and the counterflow in the interior space 36 is $$\Delta P_p = -\int_{-L}^{0} \Delta \rho g \, dy = -\rho g L (\beta \Delta S - \alpha \Delta T), \quad (1)$$

assuming a constant temperature difference $\Delta T$ between the upwelling and the counterflow.

The pressure drop due to friction is $$\Delta P_f = \tfrac{1}{2} f \rho v^2 L/D \quad (2)$$

where f is the Darcy friction factor and v the flow velocity.

For a steady flow $\Delta P_p + \Delta P_f = 0$, so the equation describing the upwelling flow is $$-\rho g L (\beta \Delta S - \alpha \Delta T) + \tfrac{1}{2} \rho v^2 f L/D = 0, \quad (3)$$

or $$v^2 = [2gD/f(v)](\beta \Delta S - \alpha \Delta T). \quad (4)$$

An expression for $\Delta T$ is obtained by considering an energy balance on a control volume of fluid in the flow segregating tubes 24. The resulting equation is $$\frac{\pi}{4} D^2 \rho v (C_p dT + g dy) = \pi D U \Delta T \, dy, \quad (5)$$

where the conductance through the tube from the counterflow to the upwelling is $$U = \frac{1}{2D/Nu \cdot k + R_w}, \quad (6)$$

with Nu being the Nusselt number for the flow, k the thermal conductivity of seawater, and $R_w$ the thermal resistance of the tube wall. Simplification yields $$C_p dT = \left( \frac{4 U \Delta T}{\rho v D} - g \right) dy, \quad (7)$$

which is integrated from depth L to surface (y=0) to obtain $$T_o' - T_1 = \frac{4 U L \Delta T}{\rho C_p v D} - \frac{gL}{C_p}, \quad (8)$$

The tube outlet temperature $T_o'$ is also $$T_o' = T_o - \Delta T. \quad (9)$$

Therefore $\Delta T$ can be solved by $$\Delta T = \Delta T^* \left( 1 + \frac{4UL}{\rho C_p v D} \right)^{-1}, \quad (10)$$

where $\Delta T^* = (T_o - T_1) + gL/C_p$.

Note that $T_o - T_1$ is the maximum temperature difference in this system, and $gL/C_p$ corresponds to the potential energy change of the upwelled seawater. $T_o - T_1$ might be 10° to 15° C. For a depth L of 500 meters, $gL/C_p$ is 1.2° C.

Substituting for $\Delta T$ in Equation (4) gives $$v^2 = \frac{2gD}{f(v)}\left[\beta\Delta S - \alpha\Delta T^*\left(1 + \frac{4UL}{\rho C_p v D}\right)^{-1}\right], \quad (11)$$

For a given diameter D, this equation implicitly determines the velocity v of the upwelling flow, and therefore the volume flow capacity $$Q = \frac{\pi}{4} D^2 v$$

of a tube. The friction factor f in this equation depends on v; for turbulent flow, U also depends on v due to the non-constant Nusselt number.

The constant $\Delta T$ corresponds to an assumption of constant heat flux through the tube wall, which, for laminar flow, gives a constant Nu=4.36.

For laminar flow (e.g., Re<2300), Equation (11) reduces to a quadratic:

$$v^2 + bv + c = 0,$$

where
 $b = C_1 + C_2 (A-B)$,
 $c = -C_1 C_2 B$,
 $A = \alpha\Delta T^*$,
 $B = \beta\Delta S$,
 $C_1 = 4UL/\rho C_p D$,
 $C_2 = gD^2/32\nu$,
using $f = 64/Re$ and $Re = vD/\nu$.
The solution is $$v = \tfrac{1}{2}(-b + \sqrt{b^2 - 4c}).$$

A real solution is assured when c<O, i.e., when S>O, i.e., $S_o > S_1$; the other root gives a negative velocity which is not meaningful.

Once flow velocity is known, the flow per flow segregating tube 24 is given by $$Q = \frac{\pi}{4} D^2 v.$$

Given a total flow requirement $Q_T$ to supply a sea farm, the number of tubes can be computed as $n = Q_T/Q$.

If it is considered that the main duct or shell inside diameter $D_S$ is such that the cross sectional area for the flow inside the main duct 14 equals the cross sectional area for flow inside the flow segregating members 24, then $$D_s = \sqrt{2n}\; D,$$

Thus the shell inside diameter $D_s$ can be calculated, completing the basic design.

Sample parameters for the mariculture device 10 are shown in the following table:

TABLE 1

| Mariculture Device Parameters | | Gulf of Mexico Off Florida | Pacific Ocean Off Chile |
|---|---|---|---|
| Surface Water Salinity | ($S_o$) | 36 0/00 | 35 0/00 |
| Deep Water Salinity | ($S_1$) | 35 0/00 | 34.5 0/00 |
| Surface Water Temperature | ($T_o$) | 26° C. | 19° C. |
| Deep Water Temperature | ($T_1$) | 9° C. | 8° C. |
| Total Upwelling Flow | ($Q_T$) | 1.32 m³/S | 1.32 m²/S |
| Length of Main Duct | (L) | 500 m | 500 m |
| Flow Segregating Tube Diameter | ($D_{optimum}$) | 11 cm | 4.5 cm |
| Number of Tubes | (n) | 1,201 | 22,249 |
| Main Duct Diameter | ($D_S$) | 5.39 m | 9.49 m |
| Velocity of Upwelling Flow | (v) | 11.6 cm/S | 3.7 cm/S |
| Constant Temperature Difference Between Upwelling and Counterflow | ($\Delta T$) | 2.36° C. | 1.51° C. |
| Reynolds Number | (Re) | 11,360 | 1,342 |

The mariculture device 10 thus provides a method of marifarming in an oceanic area where relatively deep water at a predetermined depth in comparison to surface water has the characteristics of being relatively cold, relatively fresh and relatively nutrient rich. The surface water in comparison to the relatively deep water has the characteristics of being relatively warm, relatively saline and relatively nutrient deficient. Consequently, the mariculture device is used to cause the relatively deep water at a first vicinity of the predetermined depth in the ocean to flow at a first predetermined flow rate upward toward the water surface where it is dispersed in a first vicinity of the water surface. The water from a second vicinity of the water surface is caused to flow at a second predetermined flow rate downward toward the predetermined depth in the ocean and is dispersed in a vicinity near the predetermined depth which does not interfere with the upwardly flowing deep water. Since a flow path containing the downwardly flowing surface water is merged in the flow of the upwardly flowing cooler water, there is segregated yet intimate contact between the two different water temperatures to provide a desirable heat transfer from the warmer water to the colder water.

The mariculture device 10 thus maintains a desired counterflow by virtue of the difference in density between the surface water and the water at the predetermined depth. Such difference in density is due to the difference in salinity between the surface water and the relatively deep water. Thus a salinity driven oceanographic upwelling is obtained for marifarming at a cost which makes such marifarming feasible.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as defined by the claims which follow.

The embodiments of the invention in which an exclusive property or privilege is claimed are defined as follows:

1. A method of marifarming in an oceanic area where relatively deep water at a predetermined depth in comparison to surface water has the characteristics of being relatively cold, relatively fresh and relatively nutrient rich, and the surface water in comparison to the relatively deep water has the characteristics of being relatively warm, relatively saline and relatively nutrient deficient, said method comprising:

(a) causing the relatively fresh, deep water at a first vicinity of the predetermined depth in the ocean to flow at a first predetermined flow rate upward toward the surface, and dispersing said first predetermined flow rate in a first vicinity of the surface;

(b) causing the relatively saline water from a second vicinity of the surface to flow at a second predetermined flow rate downward in a direction counter to the flowing of the relatively deep water toward said predetermined flow rate in a second vicinity of said predetermined depth;

(c) exchanging a heat of the flow of the second flow rate and a heat of the flow of the first rate, such that, the relatively fresh water dispersed at the first vicinity of the surface has a lower density than the relatively saline water occupying the first vicinity, and the relatively saline water dispersed at the second vicinity of said predetermined depth has a higher density than the relatively fresh water occupying the second vicinity;

(d) utilizing an upward conveying action and a downward conveying action associated with a difference in density between the relatively fresh water being dispersed at the first vicinity and the relatively saline water being dispersed at the second vicinity to maintain a counterflow of the relatively saline water and the relatively fresh water without a need for a drive means external to the oceanic area;

(e) confining the flow of said first flow rate to a first flow path and confining the flow of said second flow rate to a second flow path;

(f) segregating said first flow path and said second flow path in a manner to ensure separation between the dispersed relatively fresh water and the dispersed relatively saline water; and (g) substantially preventing said relatively saline water being dispersed at said second vicinity of said predetermined depth from recirculating into said first flow path by said segregating said first and second flow paths so as to substantially prevent said counterflow from ceasing.

2. The method of claim 1, including transferring the heat of the flow of said second flow rate to the flow of said first flow rate such that the flow of the first flow rate being dispersed in the first vicinity of the surface is heated to approximately the temperature of the surface water.

3. The method of claim 1, including transferring the heat of the flow of the second flow rate to the flow of the first flow rate such that the flow of the second flow rate being dispersed in the second vicinity of said predetermined depth is cooled to approximately the temperature of the water at said predetermined depth.

4. The method of claim 1, including transferring the heat of said second flow path to said first flow path by merging one of said first and second flow paths into the flow of the other said path such that said one path is in intimate contact with the flow of the other said path.

5. The method of claim 4, including controlling the amount of intimate contact between said one path and the flow of the other said path such that the first flow being dispersed in the first vicinity of the surface water is heated to approximately the temperature of the surface water.

6. The method of claim 5, including maintaining a constant temperature difference between said one path and the flow of the other said path.

7. The method of claim 4, including controlling the amount of intimate contact between said one path and the flow of the other said path such that the second flow being dispersed in the second vicinity of the predetermined depth is cooled to approximately the temperature of the water at the predetermined depth.

8. The method of claim 7, including maintaining a constant temperature difference between said one path and the flow of the other said path.

9. The method of claim 4, including merging the second flow path in the flow of the first flow path.

10. The method of claim 4, including maintaining the counterflow by the difference in density between the surface water and the water at said predetermined depth, the difference in density being due to the difference in salinity between the surface water and the relatively deep water.

11. A method of marifarming in an oceanic area where relatively deep water at a predetermined depth in comparison to surface water has the characteristics of being relatively cold, relatively fresh and relatively nutrient rich, and the surface water in comparison to the relatively deep water has the characteristics of being relatively warm, relatively saline and relatively nutrient deficient, said method comprising: causing a counterflow between the relatively deep water and the surface water to form an upwelling; maintaining said upwelling without a need for a drive means external to the oceanic area by utilizing an upward conveying action and a downward conveying action associated with a difference in density between the relatively deep water and the surface water, the difference in density being due to the difference in salinity between the surface water and the relatively deep water; confining a flow of the relatively deep water to a first flow path and confining a flow of the relatively warm surface water to a second flow path; and separating said first flow path from said second flow path in a manner to prevent said relatively warm surface water from recirculating into said first flow path so as to substantially preventing said upwelling from ceasing.

12. An upwelling device for mariculture comprising, a main duct having an elongated longitudinal wall portion, opposite end portions and a perforated cover plate at each opposite end portion, an interior space being defined in said main duct between said perforated cover plates, a plurality of elongated flow segregating members supported in the interior space of said main duct and each said flow segregating member having at least one end extending longitudinally beyond one of the perforated cover plates, a manifold plate for each end of said main duct, each said manifold plate being spaced a predetermined amount from respective said cover plates at each end portion of said main duct, at least one of said manifold plates accommodating a longitudinally extending end of said flow segregating members, the predetermined space between each said manifold plate and a respective said cover plate defining respective fluid flow paths.

13. The upwelling device as claimed in claim 12, wherein the perforations in said one cover plate provide access to the interior space of said main duct, permitting communication between one of said fluid flow paths and said interior space.

14. The upwelling device as claimed in claim 12, wherein the perforations in the other said cover plate provide access to the respective flow segregating members permitting communication between one of said fluid flow paths and the flow segregating members.

15. The upwelling device as claimed in claim 12, wherein a plurality of tubes extend through said other cover plate and said other manifold plate for communication with the interior space of said main duct.

16. The upwelling device as claimed in claim 12, wherein said flow segregating members are formed of flexible tubes between said perforated cover plates and rigid tubes between said one cover plate and said one manifold plate.

17. The upwelling device as claimed in claim 12, wherein a peripheral annular flange is provided at each said cover plate extending radially beyond the wall portion of said duct.

18. The upwelling device as claimed in claim 12, wherein the manifold plates and said cover plates are substantially coextensive in a radial direction.

19. The upwelling device as claimed in claim 12, wherein said main duct is circular in cross section.

20. The upwelling device as claimed in claim 12, wherein said main duct is formed of fiber reinforced plastic.

21. A method for providing an upwelling in open water, wherein surface water has a salinity greater than relatively deep water, and the relatively deep water has a temperature less than a temperature of the surface water, said method comprising:
  (a) causing the relatively deep water at a first region of a predetermined depth in the open water to rise and be discharged at a first region at the surface of the open water;
  (b) causing the surface water from a second region at the surface of the open water to descend in a direction opposite to the rising water and be discharged at a second region of the relatively deep water at the predetermined depth in the open water;
  (c) causing the rising water reaching the first region of the surface water to be more buoyant than the second region of the surface water, and causing the descending water reaching the second region of the relatively deep water to be less buoyant than the first region of the relatively deep water;
  (d) maintaining the flowing of the rising water and ascending water by virtue of a difference in buoyancy therebetween without a need for a drive means external to the open water;
  (e) confining the rising and discharging of the relatively deep water to a first flow path and confining the descension and discharging of the surface water to a second flow path;
  (f) segregating said first flow path and said second flow path in manner to ensure separation between the discharged rising water and the discharged descending water; and
  (g) preventing said surface water descending towards and being discharged at said second region of said relatively deep water from recirculating into said first flow path by said segregating said first and second flow paths so as to substantially prevent said flowing of the rising water and the descending water from stopping.

22. The method of claim 21, including exchanging heat between the rising water and the descending water, such that, the rising water remains at the first region of the surface water due to the higher buoyancy and lower salinity of the rising water relative to the buoyancy and salinity of the second region of the surface water, and the descending water remains at the second region of the relatively deep water due to the lower buoyancy and higher salinity of the ascending water relative to the buoyancy and salinity of the first region of the relatively deep water.

23. The method of claim 22, including initiating the flow of the rising and ascending water by priming with a drive means external to the open water, and thereafter, allowing the rising water and the descending water to flow in counter directions without the need for the external drive means.

* * * * *